Aug. 2, 1966 D. E. LAWSON 3,264,034

LOAD BEARING STRUCTURE

Filed March 25, 1964

INVENTOR.
DAVID E. LAWSON
BY
Andrus & Starke
ATTORNEYS

United States Patent Office 3,264,034
Patented August 2, 1966

1

3,264,034
LOAD BEARING STRUCTURE
David E. Lawson, 553 McIntyre Lane, Maumee, Ohio
Filed Mar. 25, 1964, Ser. No. 354,720
10 Claims. (Cl. 297—456)

This invention relates to a load bearing structure and more particularly to a contoured foam plastic load bearing unit reinforced with woven mesh.

The present invention is directed to a contoured, reinforced, foam plastic load bearing unit, such as a seating structure, having a contoured sheet of woven reinforcing mesh embedded within, and bonded to, a layer of foam plastic material.

In the load bearing unit of the invention, the mesh is a woven type in which the interlaced woof and warp strands are not welded or tied together at their points of cross-over or contact. Thus, the strands are free to move relative to each other and conform to the contoured shape by rearrangement of the distances between adjacent strands. The foam plastic which extends between the openings in the mesh maintains the mesh in the contoured shape and fixes the contour of the load bearing unit. When a load is applied to the unit, the strands tend to shift with relation to each other to stretch and distort the foam plastic between the adjacent shifting strands and this stretching of the foam plastic serves to resist further loading.

When used as a seating unit, the mesh reinforcement can be cut or slit in the area which is subjected to the greatest load, and a separate mesh panel can be applied as an unattached patch over the slit area and embedded within the foam plastic cushion. As a load is applied to the slit area, the slit tends to expand and thereby stretch the portion of the foam plastic located within the slit to prevent the feel of "bottoming" in the seat and provide a controlled amount of softness. The separate mesh panel which is located over the slit area provides a uniform, uninterrupted seating surface so that voids and pressure areas cannot be felt.

Seating units such as contoured chairs and automobile bucket seats are frequently upholstered with a fabric or plastic covering and in the fabrication of contoured seating units of this type, the covering is generally applied by cutting and sewing techniques. In the past, one-piece coverings have not been successfully applied to contoured seating units, and this is particularly true when the seat has a drop from side edge to bottom greater than three inches. One-piece coverings have not been satisfactory because the front-to-back distance through the dropped seat portion is substantially greater than the front-to-back distance along the side edge portions of the seat, and thus wrinkles will normally occur along the side edges unless the covering is cut and sewed. With the structure of the invention, a fabric or plastic material can be bonded directly to the foam plastic as an outer covering in the molding operation. The foam plastic being bonded to the outer covering, prevents the covering from shrinking or stretching and maintains the covering in a taut condition.

The load bearing unit of the invention is an integral structure which can be fabricated in a single molding operation. The foam plastic, which is bonded to both the reinforcement and to the outer covering, serves to maintain the mesh in the desired contour, while at the same time maintains the taut appearance of the covering.

Other objects and advantages will appear in the course of the following description.

The drawings illustrate the best mode presently contemplated of carrying out the invention.

In the drawings:

2

Figure 1:
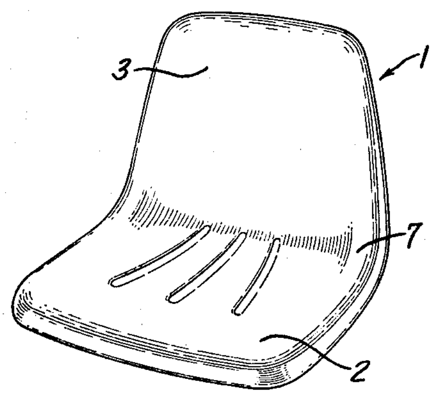
FIG. 1 is a perspective view of a seating unit fabricated in accordance with the invention.

FIG. 1 illustrates a molded, contoured chair 1 which includes a concave seat portion 2 and a generally convex back portion 3. The side edges of both the seat 2 and the back 3 are curved to provide a generally convex perimeter or margin for the chair. The chair 1 can be mounted on any desired frame or leg structure and may be used as a household chair, an automotive seat, or an office or institutional chair.

The chair 1 includes a frame 4 which extends completely around the periphery of the chair. A woven mesh sheet 5 is attached to the frame and extends continuously across the seating portion 2 and back portion 3. The mesh 5 supports a layer or cushion 6 of foam plastic material which extends upwardly from the mesh and is covered with an outer covering 7.

The frame 4 is shown as a channel-shaped element with the web of the channel facing outwardly. However, it is contemplated that the frame can have any cross sectional contour and can be made out of metal, plastic, wood or other suitable materials.

Figure 4:
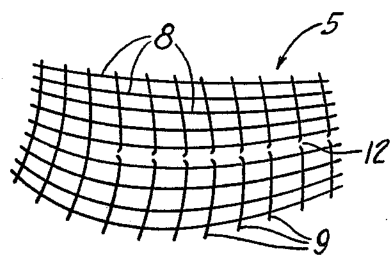
FIG. 4 is an enlarged fragmentary view of the mesh in the seating area showing the slit in the mesh.
Figure 5:
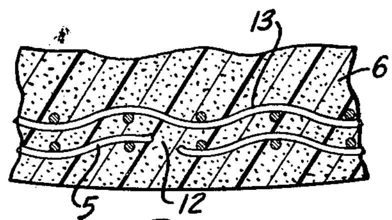
FIG. 5 is an enlarged sectional view showing the reinforcing mesh and a separate mesh patch embedded within the foam plastic.

As best shown in FIG. 4, the mesh 5 is formed of a series of woven or interlaced strands 8 and 9. In the original planar state, the strands 8 are generally parallel to each other and similarly the strands 9 are generally parallel to each other and are located approximately 90° with respect to the strands 8. Thus, in the original planar state, the openings in the mesh, defined by strands 8 and 9, are generally equal in area.

The mesh sheet 5 can be formed of metal, plastic, ceramic materials, natural occurring fibrous materials, or the like. Generally, it has been found that a hard drawn spring wire cloth is particularly suitable for use as the mesh 5. This material has a high tensile strength and can be readily deformed into the desired contoured shape.

According to the invention, the strands 8 and 9 are not attached to each other at their points of crossover and are freely movable with respect to each other. When the mesh 5 is formed to the desired contoured shape, as for example in forming the concave seating portion 2 of the chair 1, the strands 8 and 9 move relative to each other to adjust for the contoured shape with the result that the openings between the strands 8 and 9 are deformed or changed in shape and size depending upon the particular contour. Thus, the spacing between adjacent strands in the contoured portion of the structure will be different than the spacing between adjacent strands in a relatively uncontoured or planar portion of the structure. The mesh 5 carries the foam plastic cushion 6 and serves to support the load that is applied to the chair 1.

Figure 2:
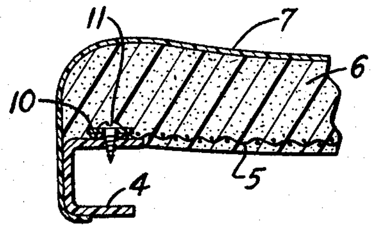
FIG. 2 is a fragmentary enlarged transverse section taken through the seat portion of the unit.

As shown in FIG. 2, the edges of the mesh sheet 5 are attached to the upper flange of the frame 4 by means of a clamping strip 10. The edge of the mesh 5 is located between the frame 4 and the clamping strip 10 and the strip is clamped against the frame by a series of screws 11. The manner in which the mesh 5 is attached to the frame 4 is not critical and any desired structure can be used to firmly anchor or attach the mesh to the frame.

When a load is applied to the concave seat 2, the strands 8 and 9 move or adjust relative to each other, tending to increase the size of the openings in the mesh. This results in the foam plastic, which is located within the openings, being stretched and distorted. The stretching of the foam plastic serves to resist further loading.

To soften the bottoming action when a load is applied to the seat portion 2, the mesh 5 can be provided with a slit or interruption 12. As shown in FIG. 4, a series of the strands 9 is severed or cut to provide the slit 12. While the slit is shown in FIG. 4 as being relatively straight, and being a single slit, it is contemplated that one or more slits may be provided and they may take any desired contour or shape.

A separate panel or section of mesh 13, similar in structure to mesh 5, is located over the slit 12 and extends outwardly from the slit in all directions. The panel 13 is not secured to the mesh 5 but is freely located on the mesh and can move relative to the mesh.

As the load is applied to the seat portion 2, the slit 12 tends to expand in size, with the result that the foam plastic, located within the slit and bonded to the mesh 5 tends to stretch and this resists the load which is applied. This stretch or distortion developed in the foam plastic softens the bottoming of the load and gives a controllable amount of softness. The panel 13, which is located over the slit 12 serves to give the seat portion a uniform seating feel so that the surface is not interrupted and voids or pressure areas cannot be felt.

The foam plastic cushion 6 can be formed of any conventional foam plastic or resin such as polyurethane, polyvinyl-chloride, polyethylene, polyester blends and the like.

The use of flexible urethane foams has proven very satisfactory and these foams are created by reacting a polyisocyanate with a polyol and water in the presence of a catalyst. The reaction between the water and the isocyanate liberates carbon dioxide which functions as a flowing agent to create a cellular structure. In some cases fluorocarbon blowing agents such as monofluorochloromethane or difluorochloromethane, can be used to create the cellular structure. These high molecular weight gases boil at low temperatures under the exothermic heat of the reaction between the isocyanate and the polyol.

The principal polyols used to prepare the polyurethane foam are polyesters and polyethers. The polyesters include those based on adipic acid, dimer acid or castor oil, while the polyethers include polypropylene glycol of 2000 molecular weight and the triols with molecular weights up to 4000 that are propylene oxide adducts of glycerine. As a specific example, the polyurethane foam can be prepared by reacting polytetramethylene either glycol with 2,4-toluene diisocyanate.

The foam plastic extends through the openings in the mesh 5 and panel 13 and serves to maintain the mesh 5 in its contoured shape. In addition, the foam plastic is tightly bonded to the outer covering 7 and serves to prevent the covering 7 from stretching or contracting to any great extent and thereby keeps the covering in a taut condition. It has been found that the crown or portion of the cushion extending upwardly of the mesh 5, should be about 2 inches thick and less than 4 inches thick. If the height of the cushion extending above the mesh 5 is too great, the outer covering 7 will be able to stretch or deform the foam plastic with the result that the taut condition of the covering will not be maintained.

The covering 7 is a one-piece unit formed of a stretchable fabric or a thermoplastic resin, such as polyvinyl chloride.

The fabric to be used as the covering 7 can be any conventional upholstering material formed of cotton, wool, glass or synthetic fibers. The fibers should be knitted or woven in a manner to provide stretch in the fabric in at least one direction.

The polyvinyl chloride or other thermosetting resin to be used as covering 7 is normally provided with a fabric backing which adds strength to the plastic material. A fabric backing is not essential but for practical purposes the fabric backing is generally used. The fabric backing applied to the thermoplastic resin covering 7 is the determining factor in the stretchability of the covering. If the fabric stretches only in one direction, the direction of stretch should be from the front edge to the back edge of the chair 1.

In the completed chair, the peripheral edge of the covering 7 is bonded to the frame 4, generally by a thin layer of foam plastic, which squeezes between the members during the molding operation. However, the peripheral edge of the covering 7 can be attached to the frame in any desired manner, such as adhesives, mechanical fasteners, or the like.

A backing member of plastic, metal or fibrous material can be attached, if desired, to the back of the chair 1 to enhance the appearance.

Figure 3:
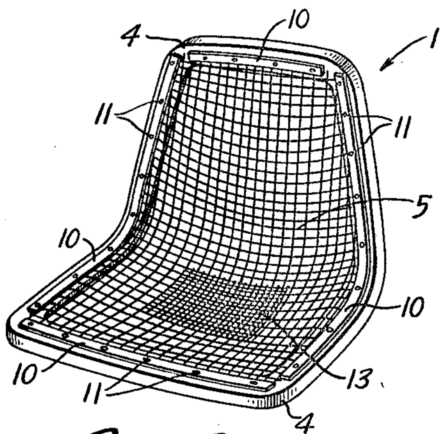
FIG. 3 is a perspective view showing the attachment of the reinforcing mesh to the frame.
Figure 8:
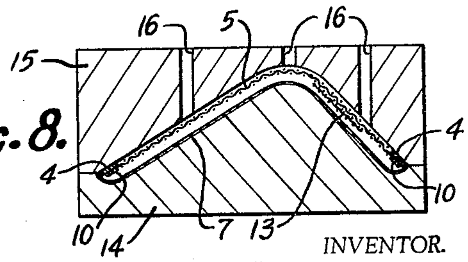
FIG. 8 is a schematic representation of the die structure employed to mold the seating unit.

To fabricate the chair, as shown in FIG. 8, the covering 7 is initially applied to the contoured surface of a female mold 14 and held against the surface, either by vacuum or pressure. With the covering 7 in the mold and the back side of the covering facing upwardly, the foam plastic in a liquid state is poured on the back of the covering 7 as a thin layer. The frame-mesh skeleton, as shown in FIG. 3, is then inserted in the mold, and the cover 15 of the mold put in place. The foam plastic expands to fill the cavity between the covering 7 and the upper surface of the mold. The molding procedure is a conventional operation and the cover 15 is provided with suitable vent holes 16 to expel the air within the mold cavity and provide an outlet for any excess foam resin.

As the resin or plastic foams and rises upwardly in the mold cavity, the upper portion of the mold cavity receives the accumulation of the rising foam and thus is provided with a greater density than the lower portion of the mold cavity as the mesh 5 is located in the upper portion of the mold cavity. The greater density foam plastic surrounds the mesh while the lesser density foam plastic provides the crown for the chair or cushion. This is highly desirable because the higher density foam bonded to the mesh will provide a greater resistance to loading, while the lesser density foam provides a soft initial feel as a load is applied to the cushion 6.

For example, when using a foam resin formulation intended to provide a cured density of 2.5 lb./cu. ft., it has been found that the portion of the foam plastic in the upper ½ to 1 inch of the mold cavity, and containing the mesh, has a density of over 3.0 lb./cu. ft. and can range up to 3.5 lb./cu. ft.

Moreover, the mesh 5 also tends to disrupt or break up the cell structure of the foam rising through the mesh, with the result that the cured foam plastic in the area of the mesh has a coarser cell structure.

After foaming has been completed, the article is removed from the mold and placed in an oven or other suitable heating unit at an elevated temperature of approximately 200° F. to cure the foam resin. Under normal conditions, a polyvinyl chloride or other thermoplastic resin covering 7 would shrink or deform when subjected to a curing temperature in the range of 200° F. However, in this situation, the composite structure which includes the wire mesh, the foam plastic and the polyvinyl chloride covering, cooperates to maintain the contour of the mesh, while at the same time preventing the contraction or shrinking of the outer covering 7 so that the covering 7 is held to a minimum shrinkage which, if anything, tends to tighten the covering.

The present invention provides a load bearing unit formed in a single molding operation in which the mesh, foam plastic and covering cooperate to maintain the contour of the seating unit. The foam plastic, which extends through the openings in the mesh 5, serves to maintain the mesh in the deformed contoured condition and prevents the mesh from returning to its original shape. Moreover, the mesh and the foam plastic aid in preventing the covering from shrinking and maintain the cover in a taut condition at all times.

Additional softness can be provided for the seating units by slitting the seating area of the mesh, as indicated by the slit 12, and employing the overlying panel 13.

While the present description was directed to a contour chair or other seating unit, it is contemplated that the structure can be employed for any load bearing unit, such as automotive dashboards, tractor seats, furniture components, toys and the like.

Figure 6:
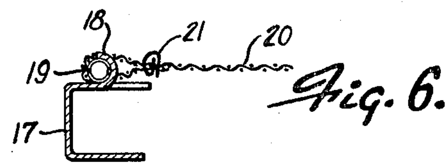
FIG. 6 is a fragmentary transverse section of a modified form of the invention showing the mesh attached to a spring element.
Figure 7:
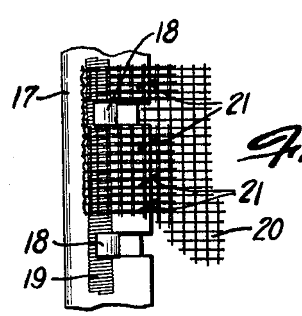
FIG. 7 is a fragmentary view showing the structure of FIG. 6.

FIGS. 6 and 7 illustrate a modified form of the invention in which the mesh sheet is resiliently attached to the frame. In this embodiment, the frame 17 has a channel-shaped cross section and is similar in shape and function to the frame 4 of the first embodiment. The peripheral edge of the frame 17 is provided with a series of spaced cutouts, and the cutout material extends upwardly in the form of generally curved ears 18. A coil spring 19 is disposed along the upper flange of the channel-shaped frame 17 and is received within the ears 18. The coil spring 19 extends continuously around the frame 17.

A sheet of reinforcing material 20, similar in structure and function to the material 5 of the first embodiment, is connected to the coil spring 19, and the coil spring serves to provide a degree of springiness or resiliency for the seat. As best shown in FIG. 6, the sheet 20 is wrapped around the coil spring 19 in a reverse bend and the overlapping layers of the sheet are connected together by a series of hog rings 21.

As in the first embodiment, the sheet 20 is embedded within and bonded to a cushion of foam plastic. In addition, a covering material, similar to the covering 7 of the first embodiment, is bonded to the foam plastic cushion and is attached to the edge of the frame 17.

The seating unit shown in FIGS. 6 and 7 functions in the manner similar to that described with respect to the unit of FIGS. 1–5. However, the connection of the mesh sheet to the coil spring 19 provides a certain degree of resiliency when the load is applied to the seating unit.

Various modes of carrying out the invention are contemplated as being within the scope of the following claims particularly pointing out and distinctly claiming the subject matter which is regarded as the invention.

I claim:

1. A load bearing unit, comprising a layer of foam plastic having a load bearing surface, and a sheet of reinforcing material embedded within the layer and bonded to the foam plastic, the portion of said sheet disposed in alignment with said load bearing surface being cut and the portions of said sheet bordering said cut arranged to spread apart laterally when a load is applied to the load bearing surface to thereby stretch and distort the portion of the foam plastic located within the cut to resist the force of said load.

2. A load bearing unit, comprising a foam plastic cushion having a load bearing surface, a sheet of reinforcing mesh formed of a plurality of interlaced spaced strands embedded within the cushion and bonded to the foam plastic, said sheet having at least one slit disposed in alignment with the load bearing surface, said slit capable of expanding laterally when a load is applied to said surface to thereby stretch and distort the foam plastic located within the slit and resist the force of the load.

3. A load bearing unit comprising a layer of foam plastic having a load bearing surface, a sheet of reinforcing material embedded within the layer and bonded to the foam plastic, said sheet having an interruption disposed in alignment with said load bearing surface and tending to spread apart when a load is applied to the load bearing surface to thereby stretch and distort the portion of the foam plastic located within the interruption to resist the force of said load, and a separate sheet-like panel disposed between the reinforcing sheet and the load bearing surface and covering said interruption, said panel tending to provide a uniform feel for said load bearing surface.

4. A load bearing unit, comprising a foam plastic cushion having a load bearing surface, a contoured sheet of reinforcing mesh embedded within the cushion and bonded to the foam plastic material, said mesh comprising a series of generally parallel spaced woof strands and a series of generally parallel spaced warp strands, a number of adjacent strands in one of said series being severed to provide a slit in said mesh, and a separate mesh section disposed in engagement with said mesh sheet and extending outwardly in all directions from said slit to thereby cover said slit, said section being embedded within and bonded to the foam plastic material and being free of attachment to said frame.

5. A load bearing unit, comprising a foam plastic cushion having a load bearing surface, a contoured sheet of reinforcing mesh embedded within the cushion and bonded to the foam plastic material, said mesh comprising a series of generally parallel spaced woof strands and a series of generally parallel spaced warp strands, a number of adjacent strands in one of said series being severed to provide a slit in said mesh, a separate mesh section disposed in engagement with said mesh sheet and extending outwardly in all directions from said slit to thereby cover said slti, said section being embedded within and bonded to the foam plastic material and being free of attachment to said frame, and a one-piece covering disposed on the outer surface of the foam plastic and bonded to said foam plastic, said foam plastic serving to maintain the mesh in the contoured shape and also serving to prevent the covering from stretching or contracting and thereby maintaining the taut condition of said covering.

6. The structure of claim 5 in which the covering is formed of a stretchable thermoplastic resin.

7. A load bearing unit, comprising a foam plastic cushion, and flexible reinforcing means embedded within the cushion and bonded to the foam plastic, said reinforcing means including a first series of spaced generally parallel strands and a second series of spaced generally parallel strands disposed in lapping relation and at an angle to said first strands, said second strands being free from attachment to said first strands and being freely movable with respect to said first strands, said first and second strands defining a plurality of openings in said reinforcing means and the foam plastic disposed within said openings, said reinforcing means having a first generally concave portion and a second generally convex portion with the openings in said concave portion having a different size than the openings in said convex portion.

8. A load bearing unit, comprising a foam plastic cushion having a load bearing surface, a contoured sheet of reinforcing mesh embedded within the cushion and bonded to the foam plastic material, said mesh comprising a series of generally parallel woof strands and a series of generally parallel warp strands, a number of adjacent woof strands being cut with the cuts being disposed along a line generally parallel to the warp strands to provide an elongated slit in said reinforcing mesh, said slit being capable of expanding laterally when a load is applied to said load bearing surface to thereby stretch and distort the foam plastic located within the slit and resist the force of the load.

9. The load bearing unit of claim 7 in which said layer of foam plastic has a portion extending outwardly from the reinforcing means to provide an outer crown and the foam plastic of the crown has a density of approximately 2.5 pounds per cubic foot and the inner portion of the foam plastic surrounding said reinforcing means has a density greater than 3.0 pounds per cubic foot.

10. The structure of claim 9 in which the inner portion of the foam plastic has a thickness of one-half to one inch and the outer crown has a thickness of two to four inches.

References Cited by the Examiner

UNITED STATES PATENTS

| | | | |
|---|---|---|---|
| 2,821,243 | 1/1958 | Toulmin. | |
| 2,980,167 | 4/1961 | Harris et al. | |
| 3,043,627 | 7/1962 | Torjusen. | |
| 3,082,486 | 3/1963 | Khawam | 264—45 |
| 3,083,056 | 3/1963 | Ward | 297—452 |
| 3,084,980 | 4/1963 | Lawson. | |
| 3,112,987 | 12/1963 | Griffths et al. | 264—45 |
| 3,142,515 | 7/1964 | Wall et al. | 297—452 |
| 3,161,436 | 12/1964 | Hood | 297—460 |

FOREIGN PATENTS

| | | |
|---|---|---|
| 939,343 | 10/1963 | Great Britain. |

FRANCIS K. ZUGEL, *Acting Primary Examiner.*

FRANK B. SHERRY, *Examiner.*

C. A. NUNBERG, *Assistant Examiner.*